United States Patent Office 3,402,126
Patented Sept. 17, 1968

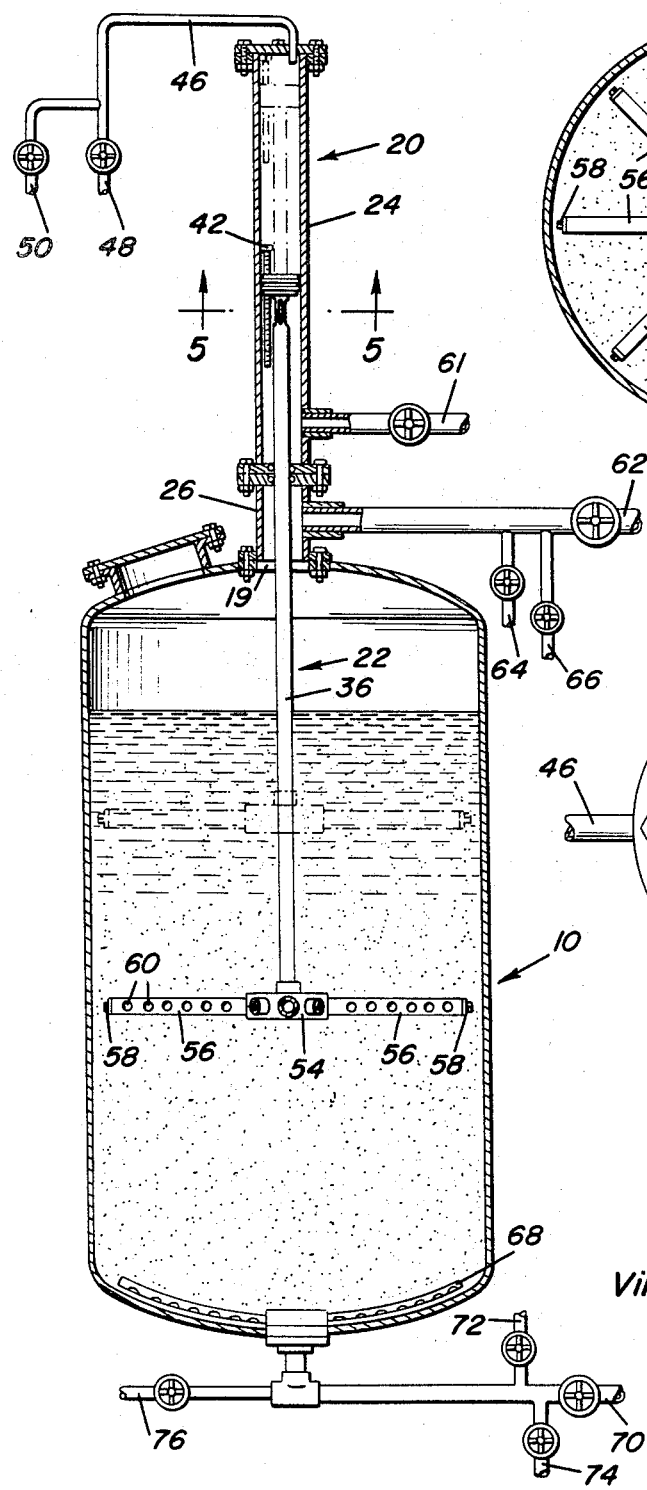
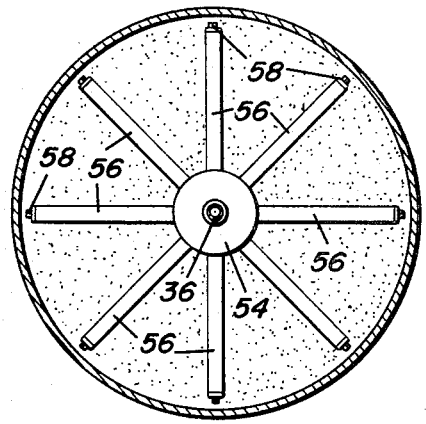
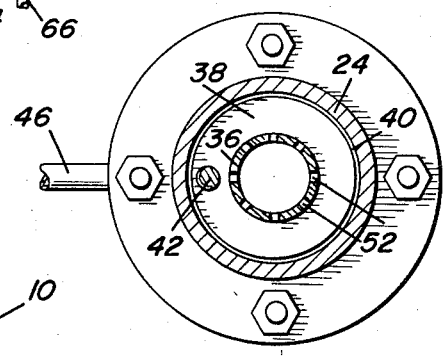
Fig. 2
Fig. 7
Fig. 5
Vincent R. Cioffi
INVENTOR.

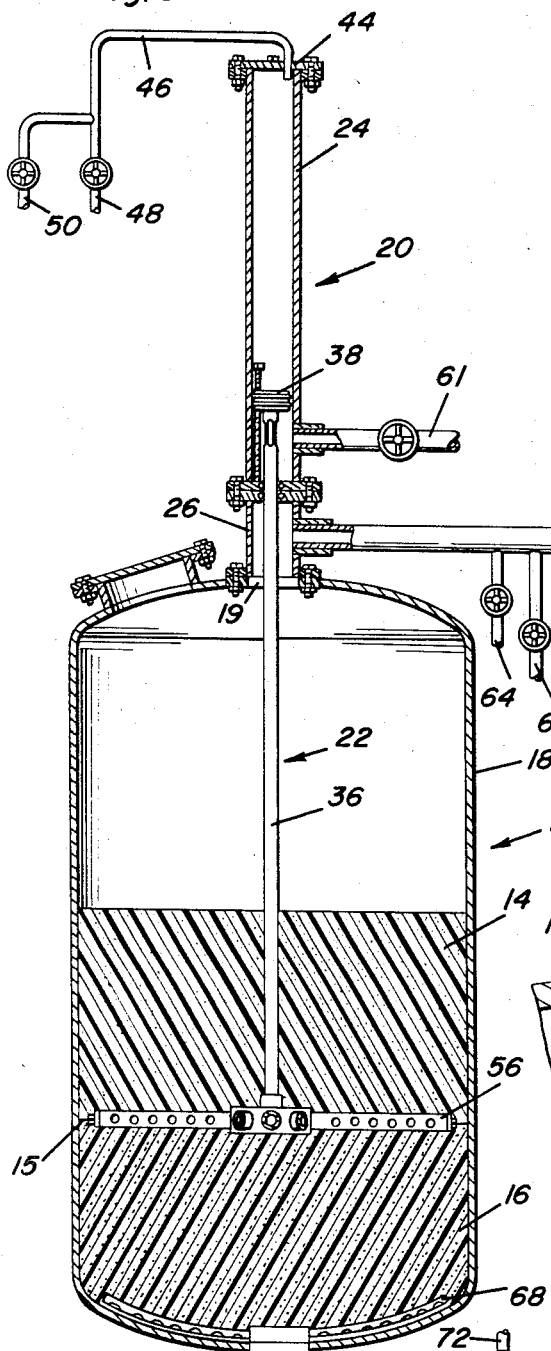
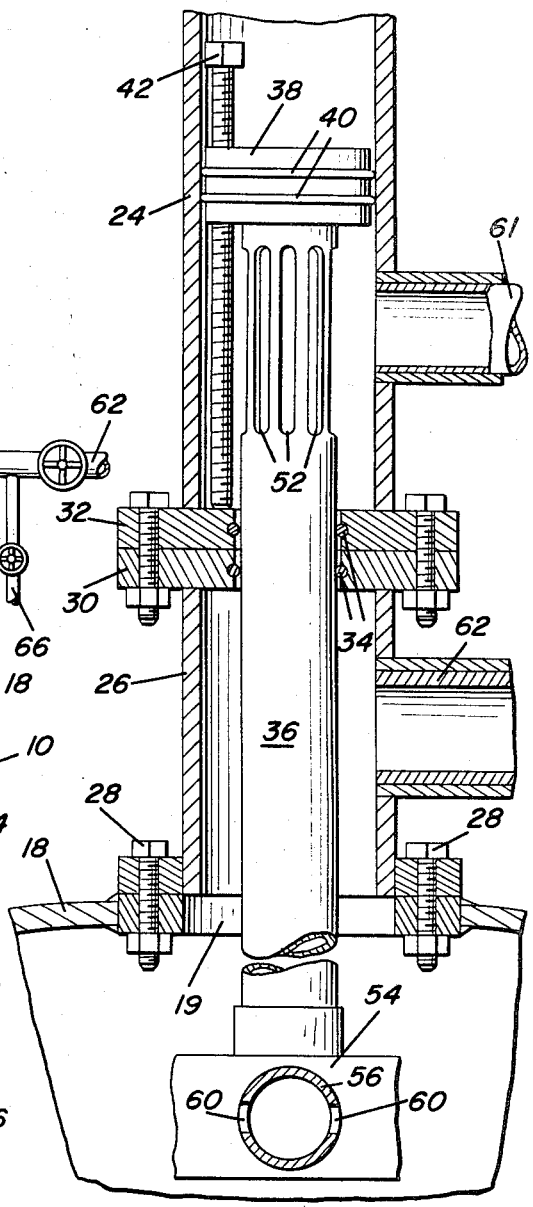

3,402,126
**MULTILAYER ION EXCHANGE RESIN SEPA-
RATOR WITH REGENERATING MEANS**
Vincent R. Cioffi, Clinton, N.J., assignor to Enpro
Incorporated, a corporation of New Jersey
Filed Oct. 23, 1965, Ser. No. 503,068
6 Claims. (Cl. 210—35)

The present invention relates generally to a mixed resin bed deionizer apparatus and more particularly to a deionizer using anion and cation exchange resins in a monobed arrangement to treat fluids to produce a deionized effluent.

More specifically, the present invention relates to an improved means for effecting regeneration of the respective exchange resins once they have become spent in the normal operation of the deionizer.

It is well known in the art of water treating that an ideal mixed exchange resin-type deionizer, to operate at optimum efficiency, requires the following conditions: The anion and cation resins must be thoroughly mixed without pockets of either resin within the monobed; the liquid to be deionized must pass evenly through the monobed without any significant "channeling"; the anion and cation resins must be thoroughly washed free of all suspended matter that settles on the resin bed during the service cycle; and the anion resin, which is generally of lesser density of the cation resin, must be collected on top of the cation resin with a sharp interface between the two resins in order to permit substantially complete regeneration of the two resins by the utilization of alkali and acid regenerants respectively.

The mixed resin exchange deionizer systems known heretofore are generally equipped with permanently fixed regenerant distributors which are intended to be embedded within the resin monobed and supposedly adapted to coincide with an interface between the anion and cation exchange resins when the resins are stratified for the purpose of alkali and acid regeneration respectively. In some of the larger deionizer units known heretofore the permanently fixed regenerant distributors are firmly held in place by stay-braces and other such supports affixed to the shell and heads of the deionizer tank. This is generally necessary to prevent the distortion of the regenerant distributor by virtue of the tremendous pressure which may be exerted upon it by the volumetric expansion of the resin during the service cycle.

In addition, it will be appreciated that the regenerant distributor must be positioned with the stratified exchange resin bed so as to be contiguous with the interface therebetween so as to assure that the respective resins may be treated with the proper regenerant solutions without being substantially contaminated by inappropriate regenerant solutions. It will therefore be apparent that the utilization of a permanently fixed exchange resin regenerant distributor may not always coincide with the interface existing between the anion and cation resins such as must exist during the regeneration thereof.

In addition to the disadvantages associated with permanently affixed resin regenerant distributors described above a certain amount of resin is lost by physical breakdown through attrition thus resulting in a shifting of the relative position of the anion-cation resin interface. Therefore under such a condition when the resins are regenerated a portion of the anion resin or cation resin, at the interface is not regenerated due to diffusion of the acidic cation regenerant into that portion of the anion resin bed or diffusion of the acidic cation regenerant into that portion of the anion resin bed, respectively. This condition gets progressively worse with each regeneration cycle until the capacity of the mixed resin monobed drops below the level of economical operation so that the exchange resins must be discarded prematurely.

A further disadvantage of the permanently fixed regenerant distributor is that "eddy currents" are formed as backwash water flows past the distributor thus causing the exchange resin to surge and "roll" within the deionizer unit with the result that the interface between the anion and exchange resins is uneven and cation with an interdispersing of both resins. In such a case it also will be appreciated that a portion of the anion exchange resin or cation exchange resin is not regenerated properly because of acidic cation exchange resin regenerant diffusion therein, or alkali anion exchange resin regenerant diffusion therein, respectively, therefore leading to the premature degradation of the resin.

Still a further disadvantage of the permanently fixed type of regenerant distributor is that it hinders homogeneous mixing of the exchange resins to form a generally "homogeneous monobed" subsequent to regeneration of the stratified anion and cation resins such as is normally accomplished by pneumatic agitation of the resins simultaneously with the flotation of the resin with a suitable liquid such as water. It will therefore be appreciated that "eddy currents" again form as the fluidizing gas billows upwardly past the fixed regenerant distributor thus preventing thorough mixing of the stratified exchange resins to form an exchange resin monobed, and as well known in the art the proper mixing of the exchange resins to form a monobed is important as it determines to a large extent the quality and purity of the deionized effluent.

It is a primary object of the present invention to provide a mixed exchange resin type deionizer apparatus with an adjustably movable regenerant solution combined distributor and collector which can selectively be embedded within the exchange resin bed at a point coinciding with the interface between the respective resins during regeneration thereof and which combined distributor and collector may be removed from within the resin bed upon completion of regeneration thereof.

Another object of the present invention is to provide a mixed resin type deionizer which is substantially devoid of any permanently embedded objects disposed within the resin bed so as to substantially preclude the possibility of "channeling" of the liquid being treated as it passes through the resin bed.

A further object of the present invention is to provide a deionizer of the class described which is provided with an improved means of positioning a regenerating solution distributor and collector at an interface between the anion and cation exchange resins utilized therein.

Still another object of the present invention is to provide an adjustable and movable regenerant solution distributor and collector for an exchange resin deionizer of the type described which can be readily adjusted to compensate for the changing position of the anion-cation exchange resin interface such as occasioned by loss of resin by attrition or the like, thereby insuring that the regenerant solution distributor and collector can selectively be placed substantially at the anion-cation exchange resin level as required thus substantially precluding the possibility of acid solution regenerant diffusion into the anion exchange resin or caustic regenerant solution diffused into the cation exchange resin.

Still another object of the present invention is to provide an exchange resin deionizer of the class described which greatly facilitates the intimate admixing of the anion and cation exchange resins utilized into a substantially homogeneous "monobed" so as to insure efficient deionization of the material effluent being treated.

Still a further object of the present invention is to provide a novel structure for an exchange resin deionizer of the class described which minimizes the physical wear or attrition of the resins during the regeneration cycle thereby lengthening the useful life of the exchange resins utilized.

Still a further object of the present invention is to provide a movable and adjustable combined regenerant solution distributor and collector which may be quickly moved in and out of the resin bed, as required, by a power operated means.

Still a further object of the present invention is to provide an exchange resin deionizer apparatus of the class described provided with a selectively movable "mid-bed" or anion-cation exchange interface regenerant solution combined distributor and collector which is further provided with adjusting means so as to insure accurate alignment of the combined distributor and collector with the anion-cation exchange interface during the regeneration of the respective exchange resins.

Still a further object of the present invention is to provide an improved method of regenerating the respective resins utilized in a mixed exchange resin deionizer apparatus so as to insure substantially complete regeneration of the respective exchange resins.

These together with other objects and advantages which will become subsequently apparent reside in the details of construction and method of operation as more fully hereinafter described and claimed, reference being had to the accompanying drawings forming a part hereof, wherein like numerals refer to like parts throughout, and in which:

FIGURE 2 is a vertical cross-sectional view of the device of FIGURE 1 further illustrating the method by which the combined regenerant solution distributor and collector may be selectively and adjustably moved into position to effect regeneration of the ion exchange resins utilized;

FIGURE 3 is a vertical cross-sectional view of the deionizer device of FIGURES 1 and 2 further showing the selectively and adjustably movable combined regenerant solution distributor and collector in position at the interface between the anion and cation exchange resins so as to permit efficient regeneration of the exchange resin;

FIGURE 4 is an enlarged fragmentary vertical sectional view of a portion of the selectively movable and adjustable combined regenerant solution distributor and collector taken substantially along the plane of the line 4—4 of FIGURE 1;

FIGURE 5 is an enlarged horizontal sectional view of a portion of the combined regenerant solution distributor and collector taken substantially along the plane of the line 5—5 of FIGURE 2;

FIGURE 6 is an enlarged fragmentary vertical sectional view of the combined regenerant solution distributor and collector wherein certain elements thereof are shown in side elevation; and FIGURE 7 is a top plan view of the regenerant solution distributor and collector taken substantially along the plane of the line 7—7 of FIGURE 1.

Figure 1:
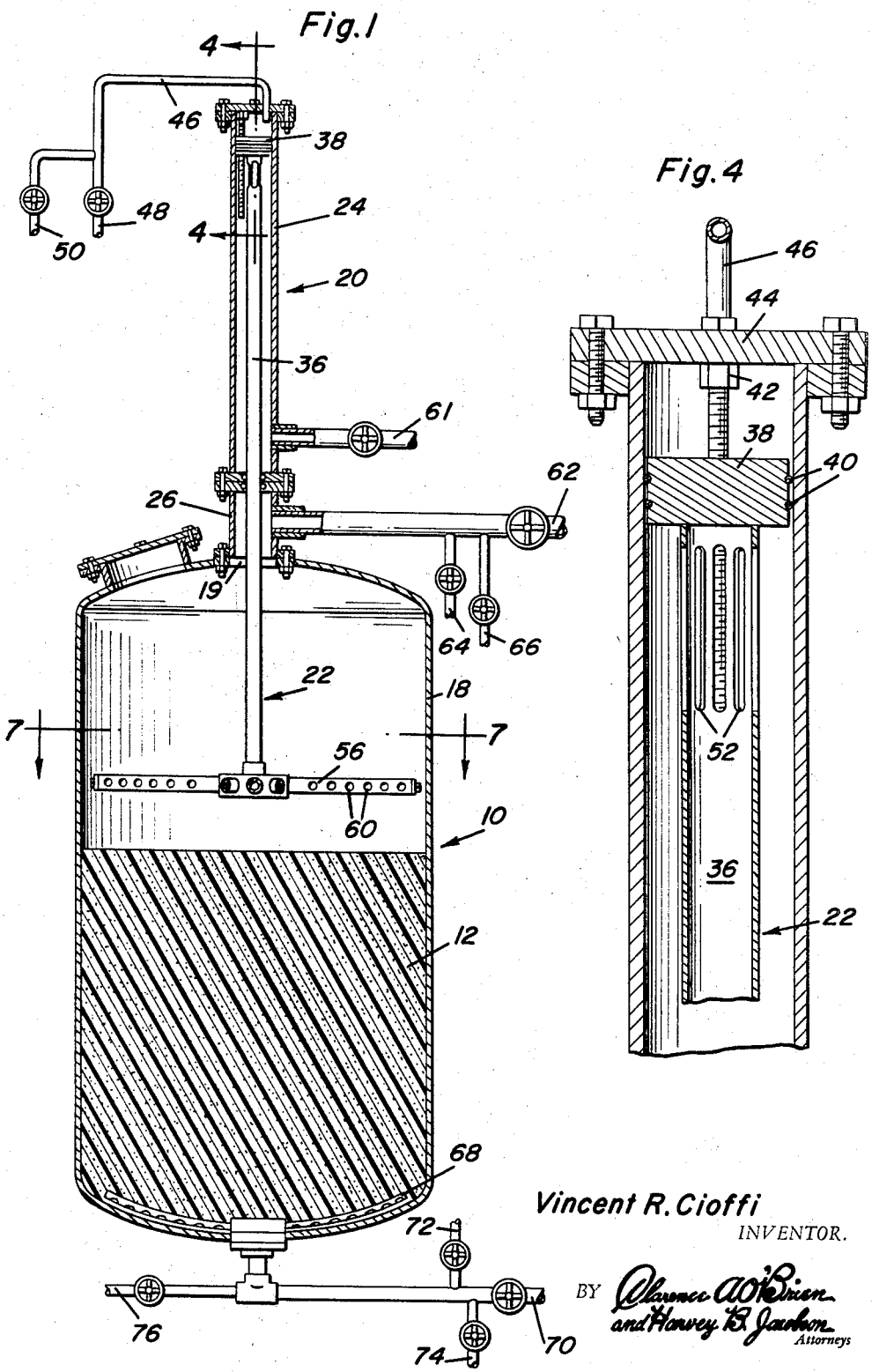
FIGURE 1 is a vertical sectional view of an exchange resin deionizing apparatus provided with an exemplary embodiment of a combined regenerant solution distributor and collector means with portions thereof shown in side elevational view as normally positioned during the service cycle of the deionizer.

Referring now to the drawings it will be seen that the numeral 10 generally indicates an ion exchange resin deionizing apparatus of the type utilizing a mixed resin bed 12 which resin bed 12 is comprised of a substantially homogeneous mixture of an anion exchange resin 14 and a cation exchange resin 16 which are contained within a suitable vessel or tank 18. As will become apparent from the following discussion the configuration of the tank 18 per se is merely illustrative and need not be of such a configuration.

The exchange resin deionizer apparatus 10 is further provided with an exchange resin bed regenerating means indicated generally at 20 provided with a selectively and adjustably movable combined regenerant solution distributor and collector means indicated generally at 22 which is mounted for sliding movement in a hydraulic-pneumatic cylinder 24 which is bolted or otherwise removably secured to an upstanding T 26 provided on the tank 18. As seen best in FIGURE 6 the T 26 is secured to the tank 18 by suitable fastening means such as bolts 28 in a manner so as to freely communicate with the interior of the tank 18. Adjacent the upper end of the T 26 is provided a perforate end member 30 which is complementary to a perforate end plate 32 provided on the cylinder 24. The plates 30 and 32 are provided with centrally disposed apertures adapted to slidingly receive the distributor and collector 22. The plates 30 and 32 are further provided with suitable seal members 34 such as O-rings or any other suitable seal material or configuration for reasons which will become clear.

The combined regenerant solution distributor and collector 22 includes a hollow shaft 36 which is provided with an integral piston 38 provided with a plurality of peripheral suitable seals 40 such as O-rings and the like, which piston and seal assembly is sized so as to be sealingly slidable longitudinally within the cylinder 24. The piston 38 is provided with a threaded aperture therethrough which is longitudinally disposed with regard to the shaft 36 and positioned outwardly thereof so as to receive a piston travel adjustment screw 42 provided with adjustable locking means not shown.

The upper end of the cylinder is sealed by a closure plate 44 which is provided with a suitable aperture for the reception of an air line 46 connected through a suitable valve by line 48 to a source of compressed air or the like, not shown. The line 46 is further provided with an air pressure relief line 50 provided with a suitable valve as schematically shown. By introducing the pressurized air to the line 46 by manipulation of the valve the region above the piston 38 within the cylinder 24 will be pressurized thereby forcing the piston and power shaft 36 downwardly. The travel of the shaft 36 downwardly will be limited by the piston travel adjustment screw 42 coming to rest against the plate 32.

As seen best in FIGURES 4–6, the hollow shaft 36 is provided with a plurality of peripherally disposed longitudinally extending slots or the like 52. The lower end of the hollow shaft 36 is provided with a hub 54 which is in turn provided with a plurality of opposed horizontally disposed distributor pipe laterals 56. The interior of the laterals 56 communicate with the hollow interior of the shaft 36 and the laterals are further provided with terminal plugs 58 which are preferably threadably secured therein so as to permit removal for purposes of cleaning the interior of the laterals 56. A plurality of apertures such as at 60 are provided to permit passage of fluids passing through the aperture 52 downwardly through the the interior of the laterals 56. A plurality of apertures als 56 through the apertures 60. As will become apparent during the description of the operation of the deionizer apparatus 20 hereinafter the perforate conduits or laterals 56 are selectively manipulated between a position above the bed as seen in FIGURE 1 inwardly therein to a position coinciding with the interface between the anion exchange resin 14 and the cation exchange resin 16, as seen best in FIGURE 3.

The cylinder 24 is further provided with a suitably valved alkaline regenerant waste conduit 61 and the T 26 is further provided with a suitably valved raw water inlet conduit 62 which is in turn provided with a suitably valved alkaline regenerant solution conduit 64 and a backwash waste discharge-flushing discharge conduit 66.

The lower portion of the tank 18 is further provided with a perforate bottom collector 68 which is in turn connected by means of suitable pipe fittings to a suitably valved service and backwash conduit 70. The service and backwash conduit 70 is further provided with an acid regenerant solution conduit 72, a waste discharge conduit 74 and a pressurized air line 76. The inlets and outlets are suitably valved as shown schematically and as indicated above are adapted to be properly connected to supply sources and waste drains indicated, the valves being operated to suit the cyclical operation of the deionizer 10 in a manner to be described hereinafter so as to provide a novel normal method of regenerating a mixed exchange resin bed.

Referring now to the method of operating the deionizer apparatus 10 the service cycle is best understood by referring to FIGURE 1. The liquid or water to be deionized flows through conduit 62 and into the top of the deionizer tank 18 through inlet port 19. It flows downwardly through the mixed-resin bed 12 and is collected by bottom collector 68, thence it flows through conduit 70 to service and/or application point.

After a predetermined quantity of liquid or water to be treated passes through the deionizer unit or when the quality of deionized effluent falls below the desired purity level the resins are said to be exhausted and require regeneration. The anion resin is regenerated with an alkaline solution usually caustic soda, and the cation resin is regenerated with an acid solution, usually hydrochloric or sulphuric acid.

The regeneration cycle is initiated by introducing backwash water through the conduit 70 into the bottom of the deionizer tank 18 by the bottom collector 68, and flows upwardly through the resin bed 12, and leaves the tank 18 through port 19 and thence to waste via conduit 66. The backwash flow is maintained at a rate and for a length of time to hydraulically disperse the anion resin, wash all resins thoroughly, and collect the anion resin on top of the cation resin since the former resin is of lesser density than the latter resin.

As seen in FIGURE 2 near the end of the backwashing step, with the anion resin 14 completely dispersed above the cation resin, pressurized air is directed to flow through conduit 48 to the top of the piston disk 38. The regenerant solution distributor collector 22 travels downward through the fluidized resin until the adjustment screw 42 stops its travel. The backwash water is shutoff thus allowing the resins to settle hydraulically with the anion resin 14 on top of the cation resin 16 as seen best in FIGURE 3.

The adjustment screw 42 permits accurate positioning of the regenerant solution distributor and collector 56 at the sharp interface of the two resins. The interface 15 can be visually observed through a glass port, not shown, in the side of the deionizer tank 18. Accordingly, should a change of interface level 15 be observed, as a result of loss of resin, the regenerant solution distributor and collector 56 can be raised or lowered by suitable adjustment of the adjustment screw 42 to compensate for this level change.

Referring again to FIGURE 3, which is the condition of the resin beds and combined regenerant solution distributor and collector 22 during regeneration, it will be understood that the caustic solution to regenerate the anion resin enters the deionizer tank 18 through conduit 64, port 19 where it flows downwardly through the anion resin bed 14, and is collected by the combined regenerant distributor and collector 56, where it flows upwardly through the hollow shaft 36 through the distributor 22, out of ports 52 and thence to waste via conduit 61. The seal members 34 prevent by-passing of the caustic soda solution. After regenerant solution injection is completed, the anion resin 14 is rinsed to remove excess regenerant from the resin bed. Rinse water is directed to flow through conduit 62 and enters deionizer tank 18 through port 19 and thence flows downwardly through anion resin bed 14 and is collected and discharged to waste in the same manner as described for the regenerant solution.

During the slow rinsing of the anion resin 14, as described above, the cation resin 16 is regenerated with a suitable acid solution, such as hydrochloric acid. The hydrochloric acid regenerant solution is directed to flow to the bottom of the deionizer tank 18 through conduit 72 and bottom collector 68 and thence flows upwardly through cation resin bed 16 and is collected, along with anion regenerant rinse water, by the combined regenerant solution distributor and collector 56 and thence flows to waste as described previously above through flow conduit 61.

After acid regenerant injection is completed, acid inlet conduit 72 is closed and rinse water is directed to flow through conduit 70 to rinse the cation resin bed of excess regenerant. The cation rinse water flows to waste with the anion rinse water.

When all of the excess alkaline and acid regenerants are washed out of anion and cation resin bed, respectively, the rinsing operation is stopped and the resins are backwashed so as to make the resin beds fluid and permit the raising of the combined regenerant solution distributor and collector means 22 with relatively little resistance. The backwashing procedure is described above. However, in this operation the backwash flow of water is maintained at a rate just sufficient to fluidize the resin and allow pressure build-up within the deionizer tank 18. When this is accomplished, the pressurized air within the cylinder 24 above the piston disk 38 is released gradually by conduit 50. The water, under pressure in the deionizer tank, enters under the piston disc 38 into the cylinder 24 via distributor 56, hollow shaft 36 and port 52 and immediately causes the piston to travel upwardly. The rate of upward piston travel is controlled by the rate the air is released from the cylinder.

The travel of the piston 38 is stopped by the adjustment screw 42 as shown in FIGURE 1. Conduit 50 is now closed. The combined regenerant solution distributor and collector means 22 will not fall by gravity when the water pressure within the deionizer tank 18 is released momentarily as a vacuum would be created above the piston disc 38.

To effect substantially homogeneous mixing of the anion and cation resin beds 14 and 16 respectively, air is introduced at the bottom of the deionizer tank 18 by conduit 76 and bottom collector 68 and bubbled upwardly through the resin beds and allowed to pass outwardly to atmosphere through port 19 and thence via conduit 66. The air flow is continued until the anion and cation resins are homogeneously mixed into the monobed 12. The monobed 12 comprises a homogeneous mixture of the anion resin 14 and the cation resin 16 and is given a final rinse with raw water introduced through the conduit 62, port 19 into the interior of the tank 18 and thence downwardly through the monobed 12 and out of the tank 18 by the bottom collector 68 and thence to waste via conduit 74.

When the quality of the rinse outlet effluent reaches a desired level of purity, the rinse outlet conduit 74 is closed and the deionized effluent is sent on to service and/or application point via conduit 70. The deionizer unit 10 is now back in the service cycle position as previously described.

Without departing from the spirit of my invention the sequence of the regeneration steps, including the alkaline and acid regenerant injection and rinsing excess regenerant from the anion and cation resin beds, may be altered or changed to suit any particularly desired conditions of the mixed ion exchange resin deionizer apparatus. This would depend upon the kind or type of anion and cation exchange resins used in the system, the physical and chemical characteristics of liquid or water to be treated or deionized, the quality of deionized effluent desired, etc.

It will therefore be seen that the adjustable and selectively movable combined regenerant solution distributor and collector means 22 described above permits regeneration of the anion and cation exchange resins in either an upward or downward flow pattern. The same of course also applies to rinsing the resins of excess regenerant solution. This may be accomplished by directing the regenerant solution flow and the rinse flow through the combined regenerant solution distributor and collector 56 by conduit 61 and thence downwardly through ports 52, shaft 36 and distributor 56 and thence to waste via the bottom collector 68 or upper port 19 of the deionizer tank 18.

While the ion exchange resin and regenerating means 20 has been described and illustrated in conjunction with an apparatus as shown in FIGURES 1 through 6 it will be understood that the regenerating means 20 constructed in accordance with this invention may be readily adapted to existing deionizer systems to replace the permanently fixed type distributors generally utilized heretofore.

From the foregoing it will also be apparent that the combined regenerant solution distributor and collector constructed in accordance with the present invention is not subjected to the tremendous pressures of the resin bed 12 due to expansion of the resin bed 12 during the service cycle. Accordingly, a combined distributor collector of the type herein disclosed may be constructed more economically without sacrificing efficiency of operation.

It will be further understood that the combined regenerant solution distributor and collector means 22 may be operated by means other than that illustrated and described, i.e., such as electrical or mechanical means for example.

The foregoing is considered as illustrative only of the principles of the invention. Further, since numerous modifications and changes will readily occur to those skilled in the art, it is not desired to limit the invention to the exact construction and method of operation shown and described, and accordingly all suitable modifications and equivalents may be resorted to falling within the scope of the invention as claimed.

What is claimed as new is as follows:

1. In combination with a mixed resin bed deionizer apparatus of the type adapted to utilize a monobed comprised of anion and cation exchange resins, a resin bed regenerating means, said regenerating means comprising a selectively positionable combined regenerant solution distributor and collector means mounted for movement within said tank and an operating means operatively connected to said combined regenerant solution distributor and collector means, said operating means being constructed and arranged to selectively move said combined regenerant solution distributor and collector means to a point within the resin bed coinciding with an interface between the anion and cation resins contained within said deionizer apparatus so as to improve and facilitate the independent regeneration of the resins.

2. In combination a mixed resin bed deionizer apparatus of the type adapted to utilize a monobed comprised of anion and cation exchange resins comprising a tank means, a resin bed regenerating means mounted for movement within said tank, said regenerating means comprising a selectively positionable combined regenerant solution distributor and collector means, an operating means operatively connected to said combined regenerant solution distributor and collector means, said operating means being constructed and arranged to selectively move said combined regenerant solution distributor and collector means to a point within the resin bed coinciding with an interface between the anion and cation resins contained within said deionizer apparatus so as to improve and facilitate the independent regeneration of the resins.

3. The combination of claim 2 wherein said combined regenerant solution distributor collector means comprises a movable perforate member adapted to receive regenerant solution from a suitable source of supply, said movable perforate member being adapted to be selectively moved to an anion cation resin interface by said operating means.

4. The combination of claim 3 wherein said operating means includes a pneumatically-hydraulically operated cylinder means operatively associated with said movable combined regenerant solution distributor collector means, said cylinder being adapted to be selectively actuated to move said distributor and collector means to an anion-cation resin interface.

5. In a method of regenerating a mixed ion exchange resin deionizing bed of at least two dissimilar ion exchange resins wherein the resins are backwashed to separate them into distinct layers, the improvements comprising moving downwardly through the bed from a position above the bed a selectively movable combined regenerant solution distributor and collector means to an interface between two of said distinct layers, independently regenerating the distinct layers by separately introducing the regenerants from the bottom of the lower layer and the top of the top layer and collecting the used regenerant through the distributor and collector means, and withdrawing the distributor and collector means to its original position above the bed.

6. In a method of regenerating a mixed ion exchange resin deionizing bed of at least two dissimilar ion exchange resins wherein the resins are backwashed to separate them into distinct layers, the improvements comprising moving downwardly through the bed from the position above the bed a selectively movable combined regenerant solution distributor and collector means to an interface between two of said distinct layers, independently regenerating the distinct layers by separately introducing the regenerants through the distributor and collector means, collecting the used regenerants from the bottom of the lower layer and the top of the top layer, and withdrawing the distributor and collector means to its original position above the bed.

References Cited

UNITED STATES PATENTS

| | | | |
|---|---|---|---|
| 506,879 | 10/1893 | Jewell | 210—279 X |
| 2,296,824 | 9/1942 | Ashworth | 210—279 X |
| 2,771,424 | 11/1956 | Stromquist et al. | 210—35 X |

SAMIH N. ZAHARNA, *Primary Examiner.*